March 4, 1947.                A. M. GORFIN                2,416,873
                             COWLING FASTENER
                            Filed June 24, 1944
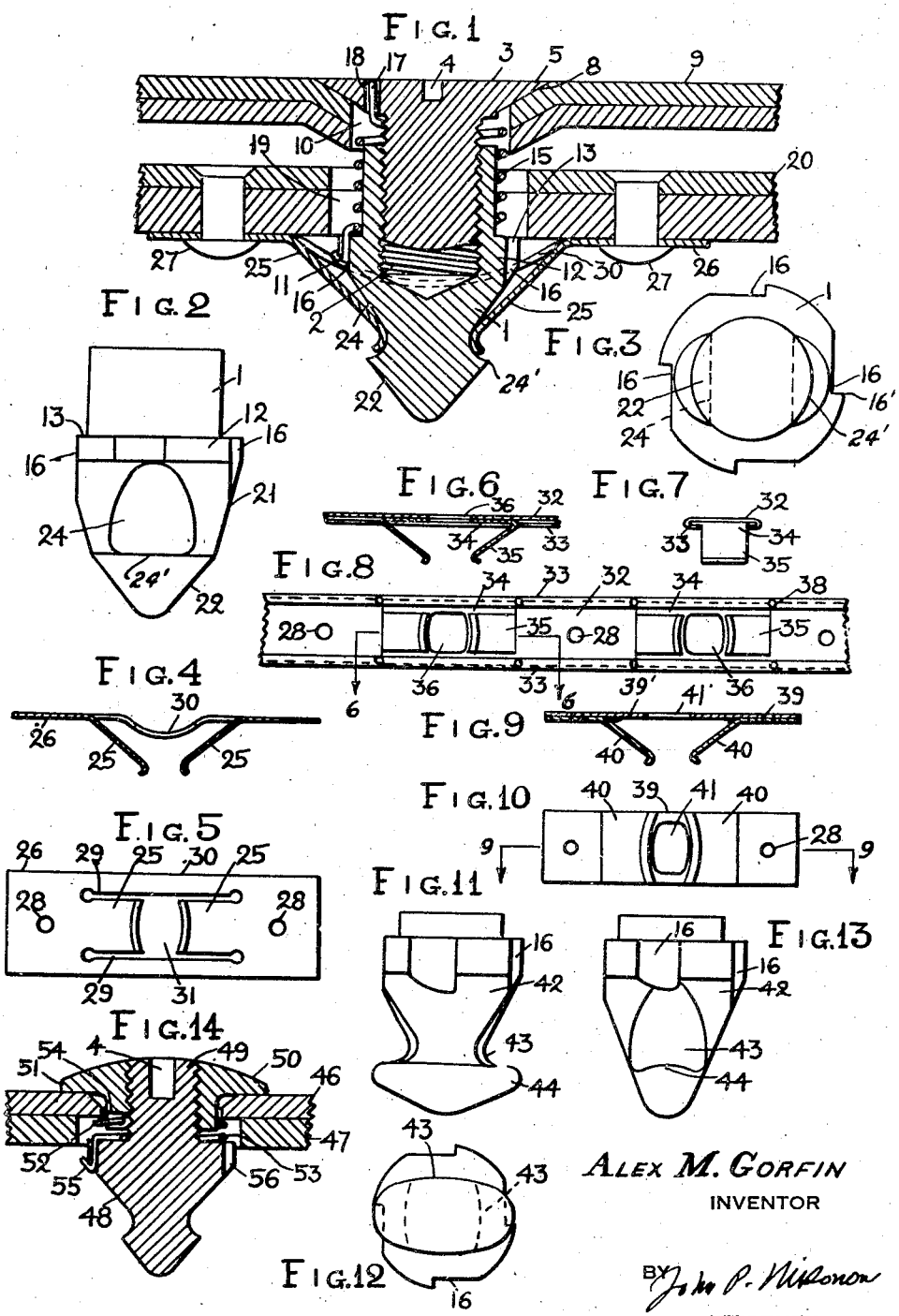
Alex M. Gorfin
INVENTOR Patented Mar. 4, 1947

2,416,873

UNITED STATES PATENT OFFICE 2,416,873

COWLING FASTENER

Alex M. Gorfin, New York, N. Y.

Application June 24, 1944, Serial No. 541,998

3 Claims. (Cl. 24—221)

My invention relates to cowling fasteners and has particular reference to detachable fastening means for cowling on airplane engines and for similar purposes.

My invention has for its object to provide a fastening which can be easily and quickly applied without the use of any special tools or appliances and which can be adjusted for any clearance or thickness of the cowling within limits of the ordinary practice.

Ordinary types of cowling fasteners are usually made of a definite length so that each particular fastening can be used only for a particular distance between the surface of the cowling and the wall or body to which the cowling is being attached, often making it necessary to use fasteners of different sizes for different portions of the same cowling, with a possibility of placing different fastenings in wrong places. Unlike such fastenings having fixed length, my fastening is made of two portions adjustably joined together so that the same fastening can be used for joining bodies of different thickness and at different distances from each other. The two portions are so joined together that the fastening can be tightened in its place by turning it in one direction, and quickly released and removed by turning the same in the other direction.

Another object of my invention is to provide a fastening with a cooperating portion attached to the body to which the cowling is being fastened, so arranged that the cooperating portion will eject the fastening when the latter is placed in a released position.

My invention is more fully described in the accompanying specification and drawing in which:

Fig. 1 is a sectional elevational view of my fastener in an operating position;

Fig. 2 is an outside view of the lower fastener portion;

Fig. 3 is a bottom view of the latter;

Fig. 4 is a sectional side view of the fastener retaining spring;

Fig. 5 is a plan view of the same;

Fig. 6 is a sectional side view of a modified spring made of two pieces;

Fig. 7 is an end view of the same;

Fig. 8 is a plan view of the same;

Fig. 9 is a sectional side view of another modification of the spring, made of two pieces;

Fig. 10 is a plan view of the same;

Fig. 11 is a front view of a modified body of the fastener;

Fig. 12 is a plan view of the same;

Fig. 13 is a side view of the same;

Fig. 14 is a sectional elevational view of a modified fastening, especially suitable for relatively thin plates or small distances between parts being joined.

My fastening as shown in Fig. 1 consists of a main body or plug 1 having a threaded bore 2 at the top for a screw clamping member 3. The latter is provided with a slot 4 for a screwdriver in a flat head 5 of a shape to fit a depression 8 formed in a cowling 9. An opening 10 is provided in the cowling for the screw.

The plug 1 has an enlarged portion 12 forming a shoulder 13 which supports a helical spring 15 or a similar resilient member. The lower end 11 of the spring is bent downward and fits in a slot 16 under a shoulder 16' of which there may be several around the enlarged portion as shown in Fig. 3. The other end 17 of the spring is bent upward and engages a narrow slot or hole 18 in the screw 3. The enlarged portion enters an opening 19 in supporting plates 20 to which the cowling is attached. The lower end of the plug or body 1 is of a frusto-conical shape at 21 and terminates with a blunt cone 22. The middle or frusto-conical portion 21 is undercut at the diametrically opposite side, forming recesses 24 with shoulders 24'. These recesses are engaged by resilient legs 25 or similar retaining members extending from a spring plate 26 permanently attached to the under side of the plates 20 as by rivets 27 passing through holes 28. The spring is shown in detail in Figs. 4 and 5 and is formed from a rectangular piece of a resilient sheet metal such as heat treated steel. The central portion has slots 29 punched out as shown, forming two legs 25 which are bent outward as shown. Bridge portions 30 are bent upward for drawing the legs closer to each other as is necessary for resilient engagement of the recesses 24. A central hole 31 is provided for the plug 1.

In assembling the fastener in place, the plug 1 is inserted first through the opening 19 which is larger than the opening 10 for the screw 3. The screw with the spring 15 is screwed into the bore 2 in the plug 1. It should be noted that for the right hand thread of the screw, the recesses or slots 16 are so shaped that they retain the lower end 11 of the spring when the screw 3 is turned to the left and allow the spring end to slide over the flange or shoulder 13 when the screw is turned to the right. The spring therefore does not prevent the screw 3 from being screwed into the bore 2 for tightening the fastener in its place. For removing the fastener, the screw 3 is turned to the left. The spring 15, having its lower end 11 held against the shoulder of one of the slots 16, will be drawn tight around the body 1, preventing relative movement of the screw 3 and causing the body 1 to be turned. When the body is turned at right angles, the recesses 24 will slide away from the spring legs 25 and the latter compressing the middle tapering portion 21, will force the plug with the screw out of the openings 19 and 10. The fastening, however, will remain on the cowling since the large flange 13 cannot pass through the relatively small opening 10 in the cowling.

A modified floating spring is shown in Figs. 6, 7 and 8. The main purpose for this spring is the self aligning of the springs in a case where a great number of fasteners are used, particularly on a surface that is not flat. It consists of a long strip 32 with bent over edges 33 which form guides for spring plates 34, each plate being bent of a single piece with flanges sliding under the guiding edges of the strip 32 and legs or hooks 35. The plates and the strip 32 are provided with holes 36 for the fasteners. The plates 34 are retained in the correct positions by nicks 38 in the bent over edges of the strip 32.

Another modification is shown in Figs. 9 and 10. The spring is formed of two pieces, welded together, a base piece 39 and legs or springs 40 welded at 39' to the base portion. The base is provided with an opening 41.

It should be noted that slot 16 can be of a ratchet type.

The end portion 44 of the main body 42 may be of an oval cross section as shown in Figs. 11, 12 and 13. Such an oval end portion has an advantage in that the side recesses 43 may be relatively deep under the protruding portions of the head 44. The sides can be made with steeper angles thereby facilitating the ejection of the plug by the spring legs of the retaining member when the fastener is turned into a released position. The main body 42 is stronger and the cam action of the head 44 will be easier for operation of tightening the fastener.

A modified fastening is shown in Fig. 14, especially adapted for joining relatively thin bodies or when the cowling 46 and the base 47 are placed close together. The main body 48 in this case is provided with a stem 49, threaded into a hole in a nut 50 having an annular flange 51 engaging the top surface of the cowling 46. The stem 49 is provided with a slot 4 for a screwdriver, the edge of the flange 51 being knurled to facilitate its rotation for tightening the fastener. The upper end 52 of a helical spring 53 engages a slot 54 in the nut 50, the lower end 55 engaging one of the slots 56 in the wide portion of the body 48. The operation of this device is essentially the same as of the device shown in Fig. 1.

The spring 15 or 53 may be of any suitable shape with any suitable number of turns.

The construction of my retaining spring has an important advantage in that the legs 25 readily bend outward when the fastener is being inserted, functioning as resilient beams fastened at their upper ends and free at their lower ends; while they become locked together by the body 22 of the fastener when the latter is inserted, effectively resisting the outward pull of the fastener. In the latter case the legs 25 function as beams fastened at the ends and resisting primarily axial compression, being therefore capable of resisting many times greater forces than when freely deflected by the downward movement of the body 22 during its insertion.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. A cowling fastener for detachably attaching a cowling to an underlying supporting member having registering openings for the fastener, the supporting member having downwardly extending converging resilient legs; in combination, a body member of the fastener having a reduced upper portion and a substantially conical lower portion, the lower portion having diametrically opposite recesses forming shoulders engaged by the ends of the resilient legs; a clamping member in threaded engagement with the body, having an enlarged head engaging the edges of an opening in the cowling for retaining the cowling on the supporting member and for drawing the cowling to the supporting member by turning the clamping member relative to the body in a direction for screwing the head and the body; and means to cause the body to rotate with the clamping member when the latter is turned in a direction for unscrewing the clamping member from the body, the body being released from the resilient legs by placing the unrecessed sides of the conical portion of the body opposite the resilient legs.

2. A cowling fastener for detachably attaching a cowling to an underlying supporting member having registering openings for the fastener, the supporting member having downwardly extending converging resilient legs; in combination, a body member of the fastener having a reduced upper portion and a susbtantially conical lower portion, the lower portion having diametrically opposite recesses forming shoulders engaged by the ends of the resilient legs; a clamping member in threaded engagement with the body, having an enlarged head engaging the edges of an opening in the cowling for retaining the cowling on the supporting member and for drawing the cowling to the supporting member by turning the clamping member relative to the body in a direction for screwing the head on the body; and a torsion spring interposed between the body member and the clamping member attached at one end to one of the said members, the other member having a slot and a shoulder engaged by the other end of the spring, the slot and shoulder being so shaped as to allow the end of the spring to slide thereover when the clamping member is screwed on the body member for drawing the cowling towards the supporting member, and to prevent the rotation of the clamping member relative to the body member in a direction for unscrewing the clamping member from the body member, the body member being released from the resilient legs when turned in a position in which the unrecessed sides of the conical portion are engaged by the legs.

3. A cowling fastener for detachably attaching a cowling to an underlying supporting member having registering openings for the fastener, the supporting member having downwardly extending converging resilient legs; in combination, a body member of the fastener having a reduced upper portion and a substantially conical lower portion, the lower portion having diametrically opposite recesses forming shoulders engaged by the ends of the resilient legs; a clamping member in threaded engagement with the body, having an enlarged head engaging the edges of an opening in the cowling for retaining the cowling on the supporting member and for drawing the cowling to the supporting member by turning the clamping member relative to the body in a direction for screwing the head on the body; and a torsion helical spring on the upper portion of the body member, the upper end of the spring being attached to the clamping member, the lower end of the spring slidably engaging the upper large end of the conical portion of the body, the said large end having a recess and a shoulder for the lower end of the spring, the recess and the shoulder being so arranged that the lower end of the spring freely slides over the recess when the clamping member is rotated in a direction for screwing the same on the body member, and the lower end of the spring is positively engaged by the shoulder when the clamping member is rotated in a direction for unscrewing the same from the body member, thereby tightening the spring on the body and causing the body to be rotated together with the clamping member.

ALEX M. GORFIN.

REFERENCES CITED

The following references are of record in the file of this patent:

UNITED STATES PATENTS

| Number | Name | Date |
|---|---|---|
| 2,200,702 | Oddie | May 14, 1940 |
| 2,252,286 | Hathorn | Aug. 12, 1941 |
| 2,230,916 | Tinnerman | Feb. 4, 1941 |
| 2,152,231 | Yaneson | Mar. 28, 1939 |
| 2,327,331 | Pender | Aug. 17, 1943 |
| 2,322,614 | Bedford, Jr. | June 22, 1943 |
| 2,329,909 | Johnson | Sept. 21, 1943 |
| 2,378,638 | Johnson | June 19, 1945 |

FOREIGN PATENTS

| Number | Country | Date |
|---|---|---|
| 542,028 | British | Dec. 23, 1941 |